(12) United States Patent
Cohen et al.

(10) Patent No.: US 11,119,437 B2
(45) Date of Patent: Sep. 14, 2021

(54) DETERMINING CLEANING FLUID THICKNESS

(71) Applicant: Hewlett-Packard Development Company, L.P., Spring, TX (US)

(72) Inventors: Lavi Cohen, Ness Ziona (IL); Michael Vinokur, Ness Ziona (IL); Sasha Zilbershtein, Ontario (CA); Hanan Sachs, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,103

(22) PCT Filed: Aug. 7, 2018

(86) PCT No.: PCT/US2018/045561
§ 371 (c)(1),
(2) Date: Oct. 27, 2020

(87) PCT Pub. No.: WO2020/032929
PCT Pub. Date: Feb. 13, 2020

(65) Prior Publication Data
US 2021/0157263 A1   May 27, 2021

(51) Int. Cl.
*G03G 21/00*    (2006.01)
*G01B 11/06*    (2006.01)
*G03G 15/00*    (2006.01)

(52) U.S. Cl.
CPC ...... *G03G 21/0011* (2013.01); *G01B 11/0625* (2013.01); *G03G 15/50* (2013.01)

(58) Field of Classification Search
CPC .......... G03G 21/0011; G03G 21/0088; G03G 21/169
USPC .......................................... 399/71, 348, 350
See application file for complete search history.

(56) References Cited

U.S. PATENT DOCUMENTS

| | | | |
|---|---|---|---|
| 4,501,486 A | 2/1985 | Landa | |
| 4,910,560 A * | 3/1990 | Kanada | G03G 21/0011 399/343 |
| 5,323,217 A | 6/1994 | Christy | |
| 5,640,655 A | 6/1997 | Shoji | |
| 5,940,673 A | 8/1999 | Han | |
| 6,312,090 B1 | 11/2001 | Griffin | |
| 6,907,826 B1 | 6/2005 | Berg | |
| 7,995,953 B2 | 8/2011 | Ozerov | |
| 9,897,965 B2 * | 2/2018 | Yawada et al. | G03G 21/0011 |
| 2009/0097883 A1 | 4/2009 | Guzman | |
| 2011/0247426 A1 | 10/2011 | Swinderman | |
| 2018/0202850 A1 | 7/2018 | Beisel | |

* cited by examiner

*Primary Examiner* — William J Royer
(74) *Attorney, Agent, or Firm* — HP Inc. Patent Department

(57) ABSTRACT

In an example, a cleaning station comprises a wiper blade to scrape cleaning fluid across a surface of a component of a print apparatus. A suction pump is to remove a cleaning fluid from a surface of the component of the print apparatus. A sensor is to determine the thickness of cleaning fluid on a surface of the component of the print apparatus. A controller is to vary a suction pressure of the suction pump based on measurements of the sensor.

15 Claims, 4 Drawing Sheets

DETERMINING CLEANING FLUID THICKNESS

BACKGROUND

Some printing systems comprise a wiper to remove cleaning fluid from a surface of a component of the printing system.

BRIEF DESCRIPTION OF DRAWINGS

Examples will now be described, by way of non-limiting example, with reference to the accompanying drawings, in which.

DETAILED DESCRIPTION

In some example printing systems, cleaning fluid is applied to a component of the printing system to remove any residual ink. In such example printing systems, a wiper may be used to remove cleaning fluid from the component of the printing system.

For example, some print apparatuses may include a photoreceptor (a photoconductive rotatable print drum, e.g. a printing image plate) and a writing module to write a latent image on to the photoreceptor. For example, the photoreceptor may be uniformly charged and then areas may be selectively discharged to create the latent image on the photoreceptor. The photoreceptor may then be inked (for example by engaging a binary ink developer to ink an area of the photoreceptor containing the latent image) to develop a charged inked image on the discharged area of the photoreceptor. Excess ink may be returned to an ink reservoir. The inked image may then be transferred to a blanket where it may be heated prior to a final transfer to a printable medium.

Some example print apparatuses may include a cleaning station. After the inked image is transferred to the blanket, the cleaning station may supply a cleaning fluid (for example an isopar or parafin oil) to the photoreceptor which may cool the photoreceptor and clean the photoreceptor by cleaning off any residual ink that was not transferred to the blanket. The cleaning fluid may also remove any contaminants present on a surface of the photoreceptor. The cleaning station may comprise a wiper, e.g. a wiper blade, that may scrape cleaning fluid across the photoreceptor to remove the cleaning fluid, and any contaminants entrained therein.

In some examples presented herein, a residual layer of cleaning fluid may remain on the surface of a component of a print apparatus that has been wiped by the wiper. For example, once the wiper has moved across the surface of the component, a layer of cleaning fluid approximately 10 nano-meters thick may remain on the surface of the component. In some examples presented herein, the thickness of this residual cleaning fluid layer may be maintained. Maintaining the thickness of this residual cleaning fluid layer to a predetermined value, or to within a tolerance of a predetermined value, may maintain the reflectance of the surface of the component of the print apparatus to within an acceptable range, or to within an acceptable tolerance of a target value.

Figure 1:
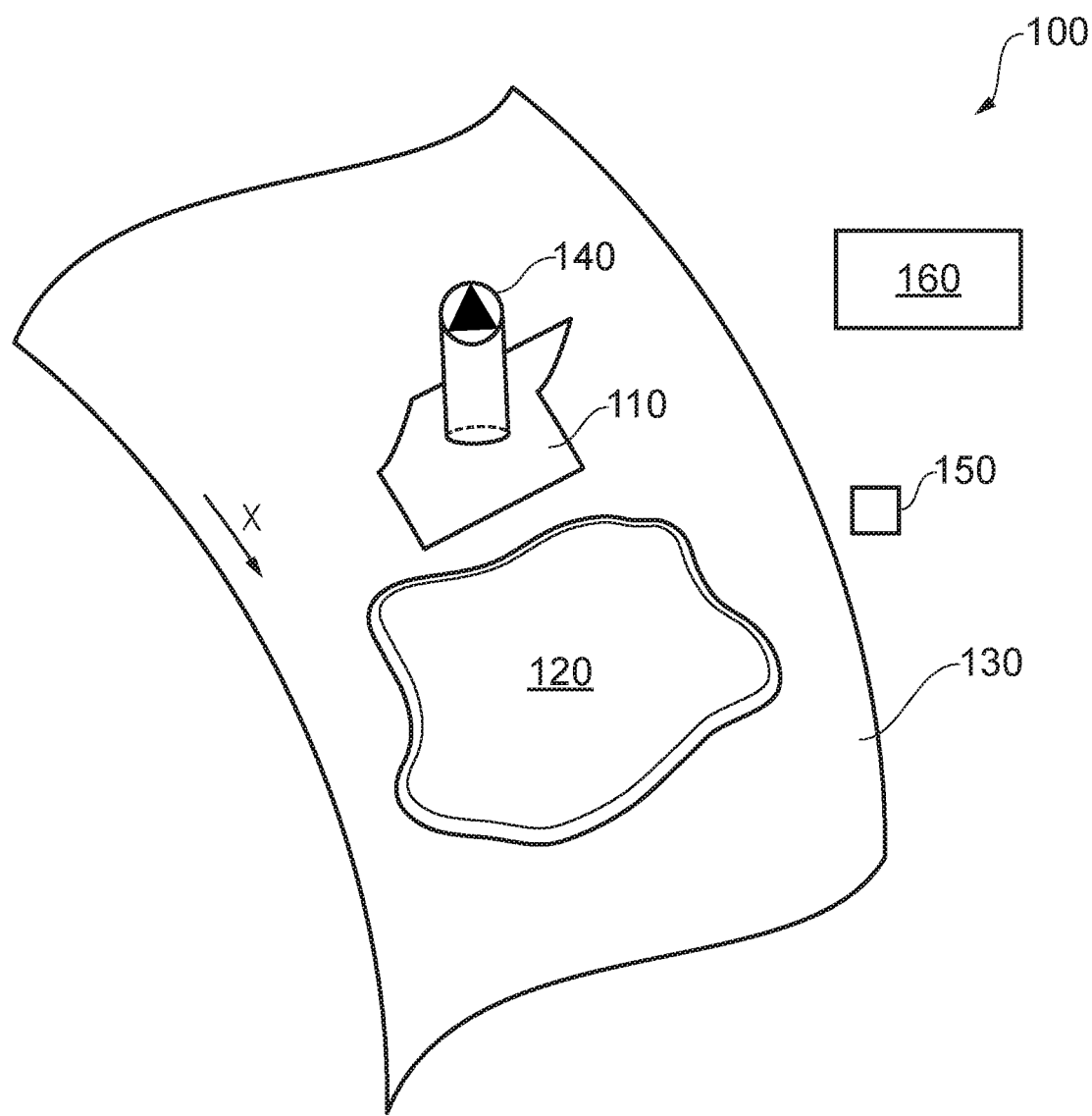
FIG. 1 is a simplified schematic of an example cleaning station.

FIG. 1 is an example cleaning station 100. The cleaning station 100 of this example comprises a wiper blade 110 to scrape cleaning fluid 120 across a surface 130 of a component of a print apparatus.

The cleaning station 100 comprises a suction pump 140 to remove cleaning fluid 120 from the surface 130 of the component of the print apparatus.

The cleaning station 100 comprises a sensor 150. The sensor 150 is to determine the thickness of cleaning fluid 120 on the surface 130 of the component of the print apparatus. The cleaning station 100 comprises a controller 160. The controller 160 is to vary a suction pressure of the suction pump 140 based on the measurements of the sensor 150.

The wiper blade 110 may be movable relative to the surface 130 of the component of the print apparatus, for example the wipe blade 110 may be movable in the direction X relative to the surface 130. For example, the wiper blade 110 may be held in a fixed position as the surface 130 may be movable relative to the wiper blade 110, e.g. in the direction X.

In one example, the component of the print apparatus may be a print drum, e.g. a photoconductive drum such as a photoreceptor, and the surface 130 may be the outer surface of the photoconductive drum. In this example, the thickness of cleaning fluid 120 on the surface of the photoreceptor may affect the reflectance of the surface. Some examples herein relate to maintaining the cleaning fluid thickness so that the reflectance is within a target range.

For example, in use, the wiper blade 110 may move across the surface 130. For example either the wiper blade 110 may be moved, e.g. under the control of the controller 160, across the surface 130 of the component, which may be stationary, or the surface 130 may be moved, e.g. under the control of the controller 160, under the stationary wiper blade 110 causing the wiper blade 110 to scrape across the surface 130. Movement of the wiper blade 110 relative to the surface may scrape cleaning fluid 120 across the surface 130, including any contaminants (e.g. residual ink) entrained therein.

For example, the wiper blade 110 may be stationary and the component may be a rotatable component of the print apparatus, which may rotate to cause the surface 130 of the component to move past the wiper blade 110. Cleaning fluid 120 on the surface 130 may be scraped by the wiper blade 110 as the surface 130 moves past the wiper blade 110. In doing so, cleaning fluid 120 may agglomerate at the wiper blade 110, for example as the wiper blade 110 continues to move into and through a deposition of cleaning fluid 120 on the surface 130.

The suction pump 140 is to apply a suction pressure to remove the cleaning fluid 120 from the surface 130 of the component. The suction pump 140 may be to remove the cleaning fluid 120 from a surface of the wiper blade 110. The suction pump 140 may be to remove the cleaning fluid 120 from the surface 130 of the component near, or adjacent to, the wiper blade 110.

According to some examples, in order to control, maintain, or regulate the thickness of cleaning fluid 120 left on the surface 130 once the wiper blade 110 has scraped cleaning fluid 120 from the surface 130, the suction pressure of the suction pump 140 may be determined and/or set and/or varied. For example, the sensor 150 is to measure the thickness of cleaning fluid 120 on the surface 130 (e.g. the thickness of cleaning fluid on an outer surface of a rotatable print drum) and the controller 160 is to determine and/or vary the suction pressure of the suction pump 140 depending on the measured thickness.

Accordingly, the cleaning station 100 may be to vary a suction pressure of the suction pump 140 depending on, or based on, a thickness of cleaning fluid 120 on the surface 130 of a component of a print apparatus.

Accordingly, the cleaning station 100 may be to maintain a thickness of cleaning fluid 120 on the surface 130 of component of a print apparatus.

In one example, the thickness of cleaning fluid 120 on the surface 130 may be maintained at, or around, 10 nanometers by setting the suction pressure of the suction pump 140 to be a corresponding value (e.g. by the controller 160). In one example, the target thickness of cleaning fluid 120 may be to maintain a uniform reflectance of the surface 130. In one example, the target thickness may be to maintain the reflectance on the surface 130 to be at a target reflectance. For example, the cleaning fluid layer target thickness may be between 0 and 20 nm, and in some examples this may allow reflectance to be within a certain tolerance and uniform.

In another example, the thickness of cleaning fluid 120 on the surface 130 may be maintained to within a tolerance of 1 nanometer around a target thickness of 10 nanometers. In this example, the suction pressure of the suction pump 140 may be set to a value to achieve the 10 nanometer thickness (e.g. by the controller 160), however if thickness actually achieved is within the range of between 9 and 11 nanometers then the controller 160 may not vary the suction pressure of the suction pump 140, as such thicknesses would be within the tolerance. In some examples the tolerance may be predetermined.

Therefore, in some examples, if the sensor 150 determines that the cleaning fluid 120 is at a first thickness then the controller 160 may cause the suction pump 140 to apply a first suction pressure to remove the cleaning fluid 120. On the other hand, if the sensor 150 determines that the cleaning fluid 120 is at a second thickness, the second thickness being larger than the first thickness, then the controller 160 may cause the suction pump 140 to apply a second suction pressure to remove the cleaning fluid 120, the second suction pressure being larger than the first suction pressure. Accordingly, the controller 160 may be to apply a suction pressure proportionate to the measured thickness of cleaning fluid 120, e.g. measured by the sensor 150.

In some examples the angle that the wiper blade 110 makes with the surface 130 may be adjustable and/or controllable. For example, the wiper blade 110 may be controlled, e.g. by the controller 160, so that the angle the wiper blade 110 makes with the surface 130 may be varied. In such examples, varying the angle between the wiper blade 110 and the surface 130 may alter the amount, e.g. the volume, of cleaning fluid 120 collected by the wiper blade 110 as the wiper blade 110 moves across the surface 130 of the print apparatus component. Accordingly, in some examples, the controller 160 may be to vary the angle between the wiper blade 110 and the surface 130. The controller 160 may be, for example, to tilt the wiper blade 110 to vary the angle between the wiper blade 110 and the surface 130.

In some examples, the controller 160 may vary the angle between the wiper blade 110 and the surface 130 to vary the volume of cleaning fluid 120 collected by the wiper blade 110 as the wiper blade 110 moves across the surface of the component. This may, in some examples, influence the thickness of cleaning fluid 120 left on the surface 130 once the wiper blade 110 has moved to scrape cleaning fluid 120 across the surface 130. Therefore, the angle of the wiper blade 110 relative to the surface 130 may be to maintain, control, or determine, the thickness of cleaning fluid 120 on the surface 130. The controller 160 may therefore be to vary the angle of the wiper blade 110, e.g. by tilting the wiper blade 110, based on the measurements of the sensor 150.

For example, if the sensor 150 determines that the cleaning fluid 120 is at a first thickness then the controller 160 may cause the wiper blade 110 to be at a first angle. The first angle may correspond to a first volume of cleaning fluid that is collected at the wiper blade 110 (e.g. at a surface of the wiper blade 110). On the other hand, if the sensor 150 determines that the cleaning fluid 120 is at a second thickness, the second thickness being larger than the first thickness, then the controller 160 may cause the wiper blade 110 to be at a second angle. The second angle may correspond to a second volume of cleaning fluid that is collected at the wiper blade 110 (e.g. at a surface of the wiper blade 110), and the second volume of cleaning fluid may be greater than the first. Accordingly, the controller 160 may be to tilt the wiper blade 110 relative to the surface 130, to change the angle between the wiper blade 110 and the surface 130 an amount proportionate to the measured thickness of cleaning fluid 120, e.g. measured by the sensor 150.

In one example, the sensor 150 may be to determine the thickness of cleaning fluid 120 on the surface 130 at a plurality of locations on the surface 130. The controller 160 may be to vary the suction pressure of the suction pump 140 to maintain the thickness of cleaning fluid 120 to within a tolerance of a predetermined thickness across a dimension of the wiper blade 110. For example, the controller 160 may be to vary the suction pressure of the suction pump 140 to maintain the thickness of cleaning fluid 120 to within a tolerance of a predetermined thickness across the length of the wiper blade 110. The controller 160 may be to vary the suction pressure of the suction pump 140 to maintain the thickness of cleaning fluid 120 to within a tolerance of a predetermined thickness across a surface of the wiper blade 110 (e.g. a cleaning fluid-facing surface of the wiper blade 110).

The sensor 150 may comprise an optical sensor. The sensor 150 may be to direct an incident light signal (e.g. white light, visible light, UV light, etc.) to the surface 130, through the cleaning fluid 120 deposited thereon, and receive a reflected light signal, reflected by the surface 130 through the cleaning fluid 120. The sensor 150 may be to determine the thickness of the cleaning fluid 120 based on the reflectance.

Figure 2:
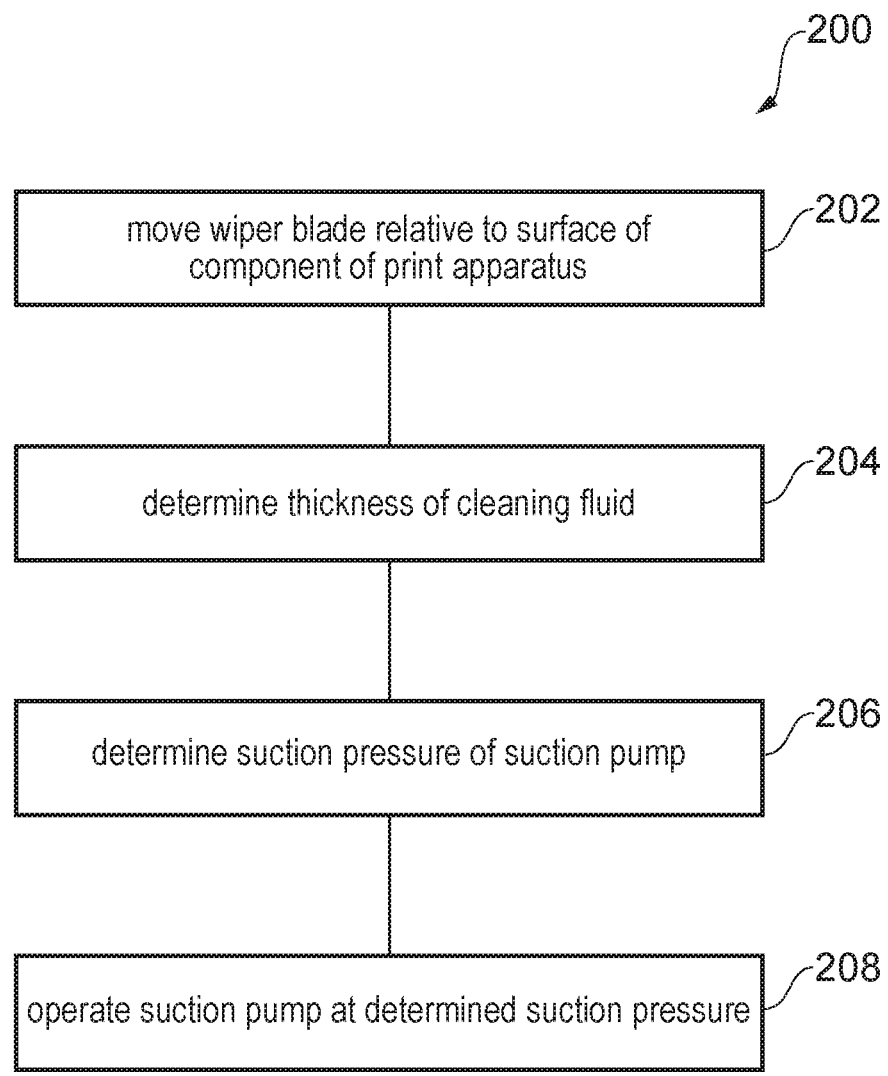
FIG. 2 is a flowchart of an example of a method.

FIG. 2 is an example method 200. The method 200 may be a method of determining a cleaning fluid thickness on a surface of a component of a print apparatus. The method 200 may be a method of maintaining a cleaning fluid thickness on a surface of a component of a print apparatus. The method 200 may be a method of maintaining the reflectance of a surface of a component of a print apparatus The method 200 comprises, at block 202, moving a wiper blade relative to a surface of a component of a print apparatus to scrape cleaning fluid across the surface. The surface may be the surface 130 of the example of FIG. 1.

Therefore, block 202 may comprise moving a surface, which may be an outer surface of a rotatable print drum, such as a rotatable photoconductive drum such as a photoreceptor, relative to a wiper blade. For example, block 202 may comprise rotating a rotatable print drum to cause its outer surface to move relative to a wiper blade. In other examples, the component of the print apparatus, and therefore a surface of the component, may remain stationary and block 202 may comprise moving a wiper blade across the surface. In one example, block 202 may comprise orienting the wiper blade relative to the surface. For example, block 202 may comprise altering the angle that the wiper blade makes with the surface.

The method 200 comprises, at block 204, determining, via a sensor, a thickness of cleaning fluid on the surface. A sensor may be disposed at or near the surface. The sensor may comprise an optical sensor. The sensor may be to direct an incident light signal (e.g. white light, visible light, UV light, etc.) to the surface, through the cleaning fluid deposited thereon, and receive a reflected light signal. The sensor may be to determine the thickness of the cleaning fluid based on the reflectance. Block 204 may comprise determining the thickness and uniformity of cleaning fluid on the surface of the component of the print apparatus.

The method 200 comprises, at block 206, determining a suction pressure of a suction pump to remove a portion of cleaning fluid from the surface, based on the determined thickness of cleaning fluid (and/or, in one example, the uniformity of cleaning fluid on the surface). For example, block 206 may comprise determining, via a controller (for example the controller 160 of the example of FIG. 1), the suction pressure at which the suction pump may be operated to achieve a target thickness of cleaning fluid on the surface of the print apparatus component. For example, the target may be 10 nanometers. In other examples, the block may comprise determining, via a controller (for example the controller 160 of the example of FIG. 1), a range of suction pressures, any one of which the suction pump may be operated to achieve a thickness within a tolerance of a target thickness of cleaning fluid on the surface of the print apparatus component.

The method 200 comprises, at block 208, operating a suction pump at the determined suction pressure. Therefore, block 208 may comprise operating a suction pump to achieve a target thickness of cleaning fluid (e.g. 10 nanometers) on the surface of the print apparatus component. Block 208 may comprise operating a suction pump to achieve a thickness within a tolerance of a target thickness of cleaning fluid (e.g. between 9 and 11, nanometers, being a target thickness of 10 nanometers±1 nanometer) on the surface of the print apparatus component. In one example, the suction pressure may be determined to maintain a thickness of cleaning fluid to within a tolerance of a target thickness (e.g. a predetermined thickness) across a dimension of the wiper blade (e.g. a length of the wiper blade) and across a portion of the surface, e.g. the portion of the surface near, or adjacent to, or in front of, the wiper blade. The wiper blade may comprise a cleaning-fluid-facing surface, e.g. the surface of the wiper blade on which cleaning fluid may agglomerate in use, and the method 200 may comprise determining the suction pressure to maintain a thickness of cleaning fluid to within a tolerance of a target thickness on this surface of the wiper blade.

The method 200 may, in some examples, comprise varying the angle of the wiper blade relative to the surface of the print apparatus component. In some examples, this may cause a greater, or lesser, amount of cleaning fluid to be removed by the suction pump. In some examples, the method 200 may comprise varying the angle of the wiper blade based on the determined thickness of cleaning fluid, at block 204.

In one example, a plurality of pumps may be provided to maintain the uniformity of cleaning fluid thickness on a surface of a component of a print apparatus. In this example, block 204 may comprise determining the thickness and uniformity of cleaning fluid on the surface and block 206 may comprise determining the suction pressure of each pump. Block 208 may then comprise operating each pump at the determined suction pressure, with the determined suction pressure of each pump being to maintain the cleaning fluid thickness along a dimension of the surface. A plurality of pumps may therefore be provided to maintain a uniform reflectance of the surface.

Figure 3:
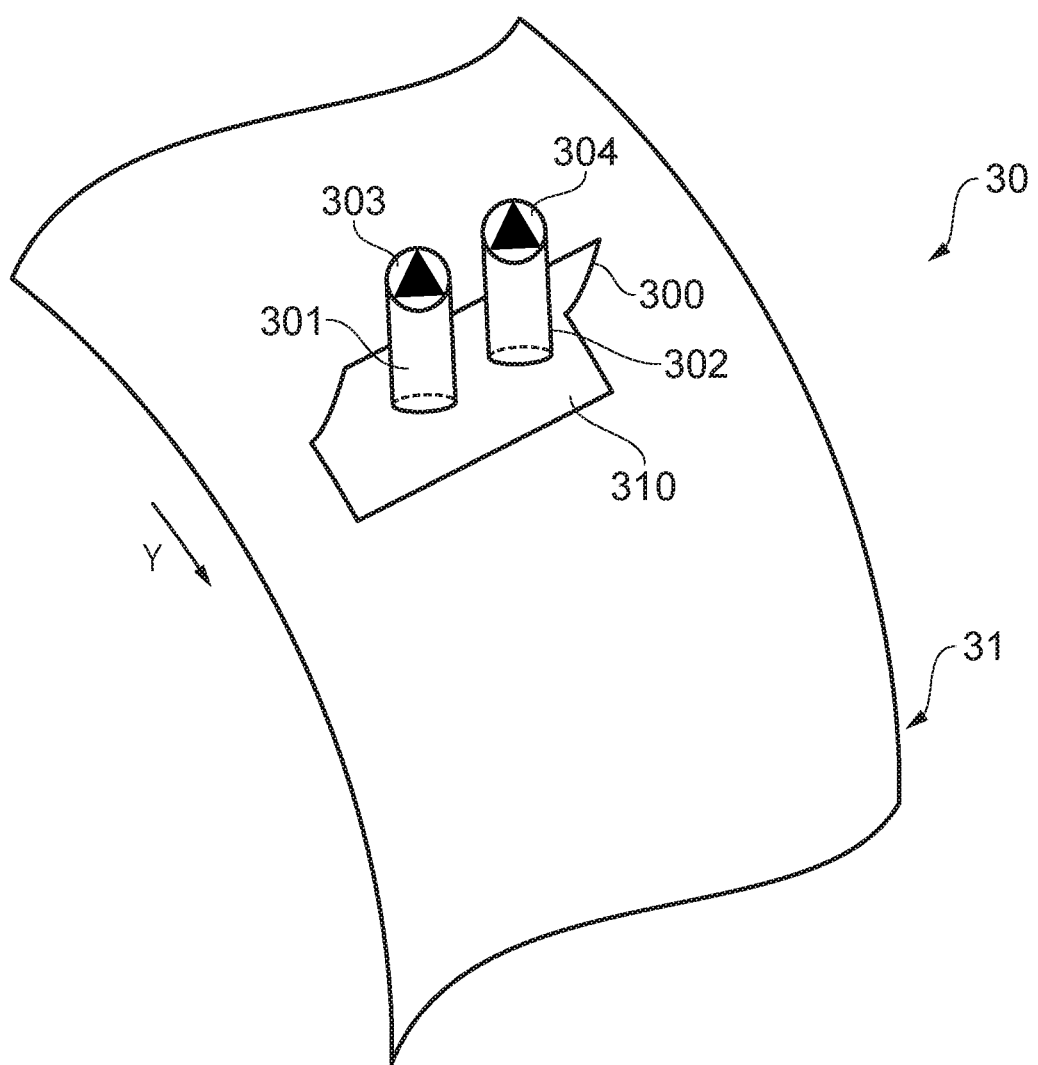
FIG. 3 is a simplified schematic of an example cleaning apparatus.

FIG. 3 shows an example cleaning apparatus 30. The cleaning apparatus 30 may be to clean a print apparatus 31. The cleaning apparatus 30 comprises a cleaning module 300 which is movable relative to the print apparatus 31. For example, the cleaning module 300 may be movable in the direction Y.

The cleaning module 300 comprises a wiper 310. The wiper 310 may be to scrape cleaning fluid across a surface of the print apparatus 31.

The cleaning module 300 comprises a first suction cavity 301 disposed at a first location relative to the wiper 310 and a second suction cavity 302 disposed at a second location relative to the wiper 310. The cleaning module 300 comprises a first pump 303 to apply suction pressure to the first suction cavity 301, and a second pump 304 to apply suction pressure to the second suction cavity 302.

The cleaning module 300 may therefore be to apply two different suction pressures, at two different locations of the wiper 310, in order to remove different volumes of cleaning fluid from a surface of the print apparatus 31. This may be to maintain a cleaning fluid thickness at the print apparatus 31. For example, the second pump 304 may operate at a higher pressure than the first pump 303, thereby removing a higher volume of cleaning fluid through the second suction cavity 302, and therefore a higher volume of cleaning fluid from the print apparatus 31. In this example, this may maintain the cleaning fluid thickness at the print apparatus 31 if the thickness of cleaning fluid in the vicinity of the second suction cavity is greater than the thickness of cleaning fluid in the vicinity of the first suction cavity 301.

The cleaning apparatus 30 may comprise a sensor to determine the thickness of cleaning fluid on the print apparatus 31. The cleaning apparatus 30 may comprise a controller to vary the suction pressure of the first and second suction pumps 303 304 based on the measurements of the sensor. In one example, the controller may be to vary the suction pressure of the first and second pumps such that a thickness of cleaning fluid is to within a tolerance of a predetermined thickness in the region of the first and second suction cavities 301 302.

The cleaning apparatus 30 may comprise a first sensor to determine the thickness of cleaning fluid on the print apparatus 31 in a region of the first suction cavity 301; and a second sensor to determine the thickness of cleaning fluid on the print apparatus 31 in a region of the second suction cavity 302. The first and second sensors, in one example, may be the same sensor, e.g. a single sensor. The cleaning apparatus 30 may comprise a controller to vary the suction pressure of the first suction pump 303 based on the measurements of the first sensor and to vary the suction pressure of the second suction pump 304 based on the measurements of the second sensor. In one example, the controller may be to vary the suction pressure of the first and second pumps 303 and 304 such that a thickness of cleaning fluid is to within a tolerance of a predetermined thickness in the region of the first and second suction cavities 301 302. The sensor may comprise an optical sensor.

The wiper 310 of the cleaning apparatus 30 may be movable to vary the angle the wiper 310 makes with the print apparatus 31. For example, the wiper 310 may be tiltable. Varying the angle that the wiper 310 makes may vary the volume of cleaning fluid removed by the first and second suction cavities 301 302. Therefore, in one example, the wiper angle and suction pressure of the first and second pumps 303 and 304 may be variable to maintain the thickness of cleaning fluid on the print apparatus 31.

Each of the first and second suction cavities 301, 302 may comprise a tubular member. For example, each of the first and second suction cavities 301, 302 may comprise a pipe.

Figure 4:
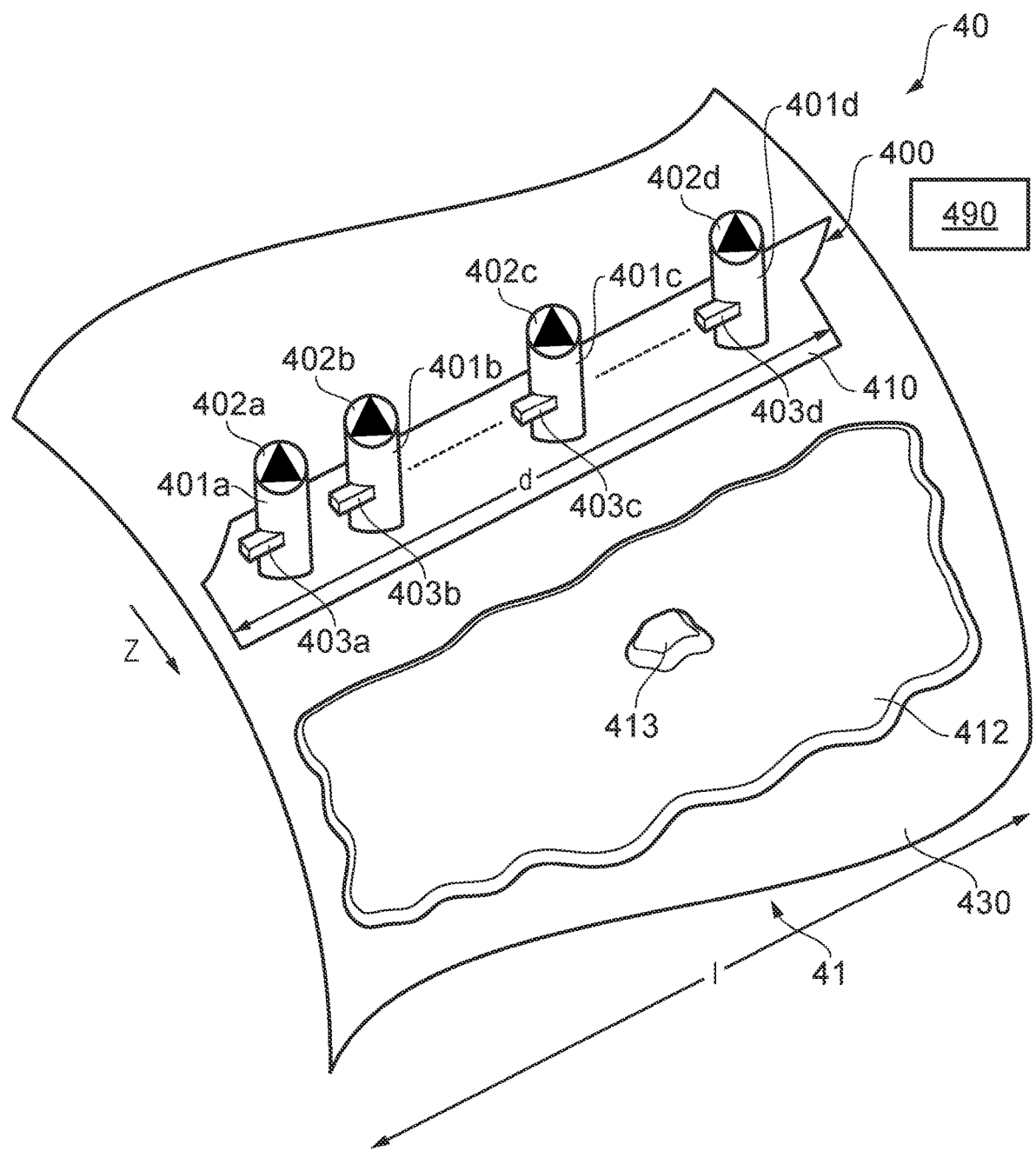
FIG. 4 is a simplified schematic of an example cleaning apparatus.

FIG. 4 shows an example cleaning apparatus 40. The cleaning apparatus 40 may be to clean a print apparatus 41 for example by cleaning a surface 430 thereof. The cleaning apparatus 40 comprises a cleaning module 400 which is movable relative to the print apparatus 41. For example, the cleaning module 400 may be movable in the direction Z.

The cleaning module 400 comprises a wiper blade 410 to scrape cleaning fluid 412 across the surface 430 of the print apparatus 41.

The cleaning module 400 comprises a plurality of suction cavities 401a-401d. Each one of the plurality of suction cavities 401a-401d are attached to the wiper blade 410 at a different location along the length of the wiper blade 410. Each suction cavity 401a-401d, is associated with a respective suction pump 402a-402d.

The cleaning module 400 therefore comprises an array of suction cavities 401a-401d and suction pumps 402a-402d.

Each suction cavity 401a-401d and suction pump 402a-402d is operably associated with a sensor 403a-403d. Each one of the sensors 403a-d is to determine the thickness of cleaning fluid 412 on the surface 430 of the print apparatus 41. In one example, each one of the sensors 403a-d is to determine the thickness of cleaning fluid 412 on the surface 430 of the print apparatus 41 in the near vicinity of the wiper blade 410. For example, each one of the sensors 403a-d is to determine the thickness of cleaning fluid 412 on the surface 430 of the print apparatus 41 in the near vicinity of the respective suction cavity 401a-d.

Each of the sensors 403a-403d may comprise an optical sensor. The or each sensor 403a-403d may be to direct an incident light signal (e.g. white light, visible light, UV light, etc.) to the surface 430, through the cleaning fluid 412 deposited thereon, and receive a reflected light signal. The or each sensor 403a-403d may be to determine the thickness of the cleaning fluid 412 based on the reflectance.

The cleaning module 400 comprises a controller 490. The controller 490 in this example is to vary the suction pressure through each of the suction cavities 401a-401d by varying the suction pressure applied to the suction cavities 401a-401d by the respective suction pumps 402a-402d associated with each respective cavity.

Therefore, in one example an optical sensor 403c is to determine the thickness of cleaning fluid 412 in the vicinity of the suction cavity 401c and the wiper blade 410. The controller 490 in this example is to determine a suction pressure at which to operate the suction pump 402c so as to apply this suction pressure to the suction cavity 401c. If the sensor 403c determines that there is an upcoming area of cleaning fluid 412 of greater thickness 413, then the controller 490 may, in this example, accordingly operate the suction pump 402c at an elevated pressure so that the area of greater thickness 413 of the cleaning fluid 412, when scraped by the wiper blade 410, is removed by the suction cavity 401c, e.g. to leave a residual cleaning fluid layer of a target thickness. Therefore, in this example, the suction pressure applied to the suction cavity 401c, by the suction pump 402c, may be greater than the suction pressure applied to the other cavities by the other pumps, to take into account the cleaning fluid area of greater thickness 413. In this way, the thickness of cleaning fluid 412 may be maintained across the length of the wiper blade 410 and the cleaning module 400.

The cleaning module 400 of the example of FIG. 4 therefore comprises an array of pumps attached to the wiper blade 410, each independently controllable. The cleaning module 400 of the example of FIG. 4 therefore comprises an array of suction cavities attached to the wiper blade 410, each with an independently variable source of pressure. This may, in some examples, allow the cleaning fluid 412 thickness to be maintained across the wiper blade 410.

In the example of FIG. 4, the wiper blade 410 extends across substantially a dimension of the print apparatus 41, or a component thereof. For example, the length of wiper blade 410 is approximately equal to the width of the print apparatus, or a component thereof. For example, the print apparatus 41 may comprise a rotatable drum, e.g. a rotatable photoconductive drum such a photoreceptor and the surface 430 may be an outer surface of the rotatable drum. In this example the drum may be substantially cylindrical, defining a height, circumference and diameter, and the width of the drum may be equal to the height of the drum.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A cleaning station comprising:
   a wiper blade to scrape cleaning fluid across a surface of a component of a print apparatus;
   a suction pump to remove cleaning fluid from the surface of the component of the print apparatus; and
   a sensor to determine thickness of cleaning fluid on the surface of the component of the print apparatus; and
   a controller to vary a suction pressure of the suction pump based on the measurements of the sensor.

2. The cleaning station according to claim 1, wherein an angle of the wiper blade relative to the surface of the component of the print apparatus is controllable.

3. The cleaning station according to claim 2, wherein the controller is to vary a wiper blade angle relative to the surface of the component of the print apparatus.

4. The cleaning station according to claim 1, wherein the sensor is to determine the thickness of cleaning fluid at a plurality of locations on the surface of the component of the print apparatus.

5. The cleaning station according to claim 1, wherein the controller is to vary the suction pressure to maintain a thickness of cleaning fluid to within a tolerance of a predetermined thickness across a dimension of the wiper blade and across a portion of the surface of the component of the print apparatus.

6. A method comprising:
moving a wiper blade relative to a surface of a component of a print apparatus to scrape cleaning fluid across the surface;
determining, via a sensor, a thickness of cleaning fluid on the surface of the component of the print apparatus;
determining a suction pressure of a suction pump to remove a portion of cleaning fluid from the surface of the component of the print apparatus based on the determined thickness of cleaning fluid; and
operating a suction pump at the determined suction pressure.

7. The method according to claim 6, further comprising:
varying an angle of the wiper blade relative to the surface of the component of the print apparatus.

8. The method according to claim 6, wherein the suction pressure is determined to maintain a thickness of cleaning fluid to within a tolerance of a predetermined thickness across a dimension of the wiper blade and across a portion of the surface of the component of the print apparatus.

9. A cleaning apparatus comprising:
a cleaning module movable relative to a print apparatus, the cleaning module comprising:
a wiper;
a first suction cavity disposed at a first location relative to the wiper;
a second suction cavity disposed at a second location relative to the wiper;
a first pump to apply a first suction pressure to the first suction cavity; and
a second pump to apply a second suction pressure to the second suction cavity.

10. The cleaning apparatus according to claim 9, further comprising:
a sensor to determine thickness of cleaning fluid on the print apparatus.

11. The cleaning apparatus according to claim 10, further comprising:
a controller to vary suction pressure of the first and second pumps based on measurements of the sensor.

12. The cleaning apparatus according to claim 11, wherein the controller is to vary the suction pressure of the first and second pumps such that a thickness of cleaning fluid is to within a tolerance of a predetermined thickness in a region of the first and second suction cavities.

13. The cleaning apparatus according to claim 9, further comprising:
a first sensor to determine thickness of cleaning fluid on the print apparatus in a region of the first suction cavity; and
a second sensor to determine the thickness of cleaning fluid on the print apparatus in a region of the second suction cavity.

14. The cleaning apparatus according to claim 13, further comprising:
a controller to vary the suction pressure of the first pump based on measurements of the first sensor and to vary suction pressure of the second pump based on the measurements of the second sensor.

15. The cleaning apparatus according to claim 14, wherein the controller is to vary the suction pressure of the first and second pumps such that a thickness of cleaning fluid is to within a tolerance of a predetermined thickness in a region of the first and second suction cavities.

* * * * *